United States Patent
Kroener et al.

(10) Patent No.: US 7,047,622 B2
(45) Date of Patent: May 23, 2006

(54) METHOD FOR MANUFACTURING A SHAFT-HUB CONNECTION

(75) Inventors: Thilo Kroener, Pulheim (DE); Karl-Heinz Simons, Merzenich (DE); Frank Peter Engels, Solingen (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 208 days.

(21) Appl. No.: 10/688,103

(22) Filed: Oct. 17, 2003

(65) Prior Publication Data

US 2004/0123707 A1    Jul. 1, 2004

(30) Foreign Application Priority Data

Oct. 17, 2002   (DE) ................. 102 48 579

(51) Int. Cl.
   *B23P 13/04*   (2006.01)
(52) U.S. Cl. .......................... 29/558; 29/557
(58) Field of Classification Search ............... 29/558, 29/557, 428, 27 C, 894, 894.012, 894.323, 29/894.325; 82/1.11
   See application file for complete search history.

(56) References Cited

U.S. PATENT DOCUMENTS

| | | |
|---|---|---|
| 442,119 A | 12/1890 | Hughes |
| 615,919 A | 12/1898 | Spears |
| 1,281,753 A | 10/1918 | Barker |
| 1,817,405 A | 9/1931 | Braren |
| 2,234,553 A | 3/1941 | Drummond |
| 3,557,647 A | 1/1971 | Foreman et al. |
| 3,782,040 A | 1/1974 | Harle et al. |
| 4,327,613 A | 5/1982 | Melby |
| 5,303,985 A | 4/1994 | Barnholt et al. |
| 6,062,117 A | 5/2000 | Shoji |

FOREIGN PATENT DOCUMENTS

| | | |
|---|---|---|
| JP | 11-19803 | 1/1999 |
| JP | 2002263904 A * | 9/2002 |

* cited by examiner

*Primary Examiner*—John C. Hong

(74) *Attorney, Agent, or Firm*—Brinks Hofer Gilson & Lione

(57) ABSTRACT

The invention comprises a method for manufacturing a shaft-hub connection. This connection includes a brake disk having a hub and a drive shaft having a bell, wherein the drive shaft comprises a catching portion having a polygonal outer contour. This portion extends into an aperture in the brake disk having a corresponding inner polygonal contour. The method comprises the procedural steps of green machining via turning of the brake disk and the drive shaft, hardening of the drive shaft, final finishing via turning of the brake disk and final finishing via turning of the drive shaft to obtain the final products with only one chucking action.

12 Claims, 4 Drawing Sheets

METHOD FOR MANUFACTURING A SHAFT-HUB CONNECTION

BACKGROUND

1. Field of the Invention

The present invention relates to a method for manufacturing a shaft-hub connection between a brake disk having a hub and a drive shaft having a bell.

2. Related Technology

Shaft-hub connections are used in mechanical engineering, particularly in the construction of vehicles. Apart from a large number of requirements, the essential task of such connections is the transmission of torque, mostly high torques. At the same time, it is desired that the shaft-hub connection be compact and lightweight and be assembled without extensive setting and adjusting work.

On the other hand, it is essential that the connection not allow relative movements between the shaft and the hub, i.e. even when no torque is transmitted, the connection needs to be free from backlash.

Further, the connected parts need to be connected in an ideally concentric and positioned manner. If they fail to meet this requirement, the resulting true running faults and wobble faults will cause unwanted noise and vibrations. In particular, when the vehicle is front-wheel driven, the wobble of a brake disk can cause vibrations in the steering wheel, and such inaccuracies resulting from the machining can be felt on the brake pedal.

Numerous approaches and developments to overcome the problems mentioned above are known. DE 198 36 259 A1, for example, describes a radial pressing device that presses the shaft-hub connection in the direction of a rotational axis in such a manner that the inner contour of the hub is in non-backlash engagement with the shaft. One drawback of this method is the necessity of additional components, requiring more space and, most of all, higher manufacturing cost.

The same applies to so-called tension set connections as known, for example, from DE 36 36 393 A1.

The use of wedge-shaped elements being inserted between the shaft and the hub is also known. However, these elements cause an eccentricity of the shaft and, hence, punctual and/or relatively small contact surfaces between the shaft and the hub.

A connection comprising so-called splines, being arranged in the region of the contact surfaces between the shaft and the hub, is widely known and practical as well. Such splines are protrusions on the shaft engaging into corresponding cavities of the hub. The manufacturing of such a connection is relatively costly because the protrusions and cavities have to engage exactly to provide, as far as possible, a connection without backlash. In this process, the shaft and the hub, i.e. the brake disk and the drive shaft, are at first prepared by so-called green machining or rough turning. In this stage, it is not yet possible to reach the final size and dimensions. The brake disk or hub requires further fine turning and broaching in subsequent steps, followed by clearing, burring, and finally checking for possible faults. The splines are formed onto the shaft by rolling, followed by hardening the shaft. Further hard finishing of the splines is no longer possible, i.e. any existing deformations due to hardening cannot later be compensated. The next step in the process is the so-called crack detection to detect any manufacturing faults. This entire manufacturing process is very difficult and hence expensive and requires the part to be checked and set in multiple turning machines.

EP 0 921 018 A1 discloses a wheel construction in which the end of the drive shaft facing the wheel is directly coupled with the brake body by means of a shaft portion having a polygonal outer contour. The brake body, or the brake disk, has a corresponding inner contour so as to form a concentric slaving portion. Basically, this wheel construction has a relatively small backlash, provided it has been exactly manufactured. This manufacturing means, an important requirement to be met by the manufacturing process, is not described in detail in EP 0 921 018 A1.

SUMMARY

It is the object of the present invention to provide a method allowing for the manufacturing of a shaft-hub connection that provides high functionality and long life. The torque transmission of the resulting shaft-hub connection shall have no backlash, to the maximum extent possible. Further, this manufacturing method is cost-effective and simple.

The invention is based on the understanding that vibrations can only be thoroughly reduced or eliminated by reducing the backlash between the shaft and the hub if this reduction in the backlash is accomplished when the shaft is in a central position relative to the hub. In this context, the wheel construction shown in EP 0 921 018 A1 or the shaft-hub connection described therein has proved to be particularly suitable for implementation via the present method. This connection ensures the concentricity of the components to be manufactured, namely the shaft and the hub. According to the present invention, such a connection can be produced in a pure turning process, instead of the usual manufacturing methods. According to the present invention, the manufacturing step of clearing (forming the inner contour of the splines) and the step of engagement rolling (forming the outer contour of the splines) are completely eliminated. Eliminating these steps allows the manufacturing of each of the components with a single chucking action. This means that, following certain preparatory work, the respective components are each chucked only once and manufactured without interruption until the final product is completed. This means that, following the green machining or manufacturing and, if necessary, a hardening process, the final or hard final machining can be accomplished without further chucking or re-chucking of the part.

Since each chucking action requires the work piece to be adjusted anew and referenced, manufacturing tolerances can be considerably reduced by reducing the need for several chucking acts. Manufactured to tighter tolerances, in their joined state, the components will have only an absolute minimum amount of backlash, especially a minimum amount of wobble.

Shaft-hub connections still need to be provided with a certain tolerance (rated/actual value) allowable manufacturing tolerances of the brake disk and the drive shaft being currently no more than 25 micrometers (drive shaft +/−15 micrometers, brake disk or hub +/−10 micrometers). These tolerances can be easily observed and met when the method according to the present invention is used (measured deviations amount to less than 10 micrometers). As mentioned above, the wobble on the brake disk should be as small as possible. Until now, a wobble of 25 micrometers was regarded as good and allowable. This tolerance can also be considerably reduced by the process according to the present invention which requires only one chucking action.

As a whole, the method according to the present invention is significantly more cost-effective and results in a considerably improved shaft-hub connection. The high accuracy is accomplished because the reference surfaces for the bearing seats and bearing shoulders are manufactured during a single chucking. The components to be manufactured remain in permanent rotation during the entire hard machining process, which also contributes significantly to a reduction in time and cost.

The essential advantage of this method according to the present invention is that the profiles of the drive shaft and the brake disk are manufactured in a single mechanical forming process and to tighter tolerances.

Further advantages and features of the invention will be understood from the following description and the attached claims.

BRIEF DESCRIPTION OF THE DRAWINGS

The example embodiments are shown and described, without being limited thereby, with reference to the attached drawings in which.

DETAILED DESCRIPTION OF THE INVENTION

Figure 1:
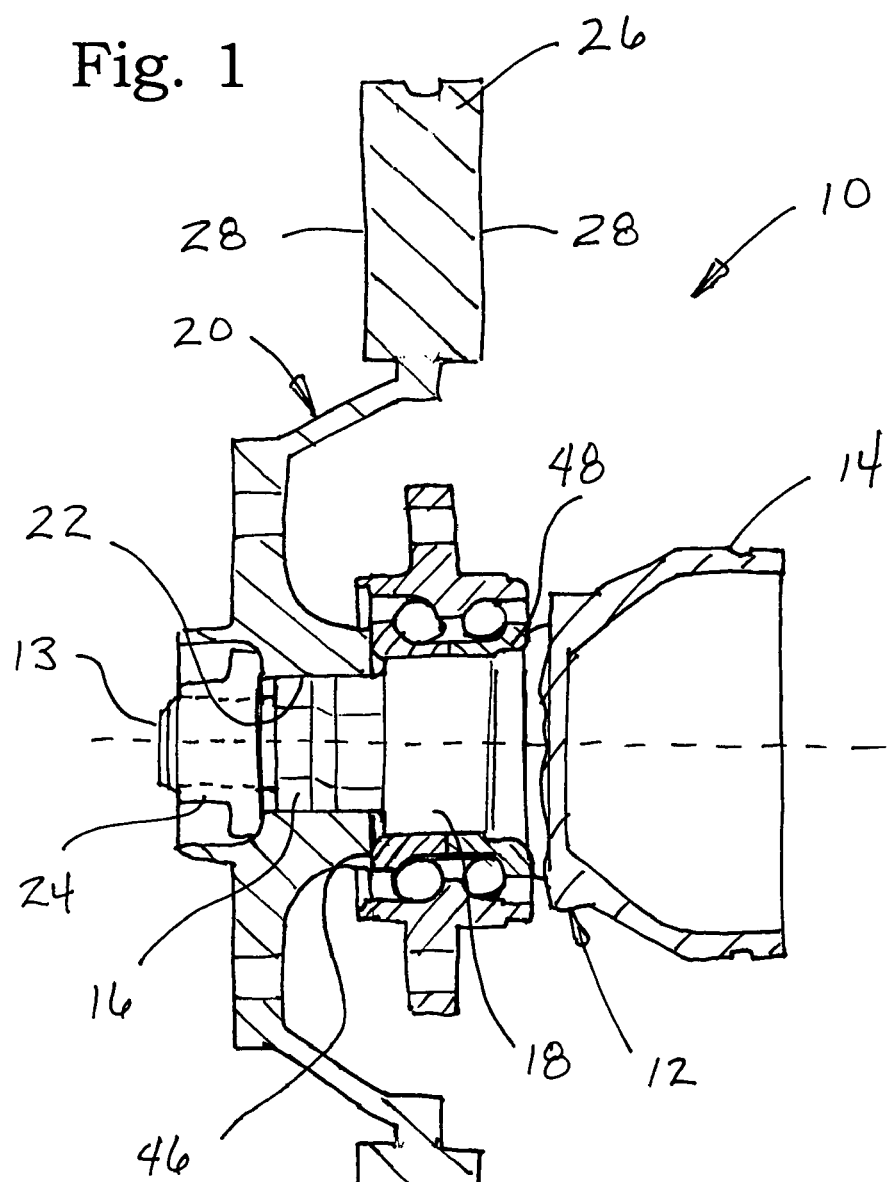
FIG. 1 shows a sectional view of a joined shaft-hub connection.

Referring now to the drawings, FIG. 1 shows a shaft-hub connection 10 manufactured according to the present invention. The shaft-hub connection 10 comprises a drive shaft 12 including a bell 14 for connecting an outer joint (not shown). The drive shaft 12 further comprises an end portion 13, a catching portion 16 and a bearing seat 18, which is adjacent to the bell 14.

When assembled, the drive shaft 12 extends into a brake disk 20 or, more specifically, into an aperture 22 of the brake disk 20. On the side of the brake disk 20 facing away from the bell 14, the drive shaft 12 is secured and/or tensioned by means of a lock nut 24 engaging the end portion 13. The brake disk 20 further comprises a brake body 26 having outwardly facing brake surfaces 28. The sectional view of FIG. 1 also illustrates that the brake body 26, which is formed as a disk or a ring, includes a circumferential groove 30 located between the brake surfaces 28.

Figure 2:
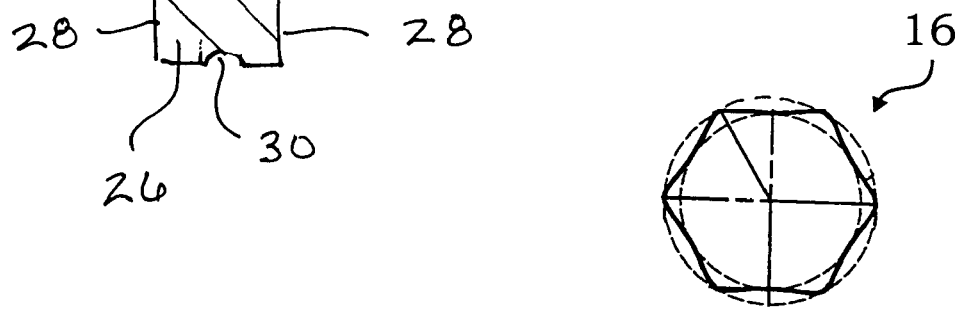
FIG. 2 shows a sectional view of a catching portion of the drive shaft.

The catching portion 16 is provided with a cycloidal or polygonal outer contour that corresponds with a cydoidal or polygonal inner contour of the aperture 22 of the brake disk 20, enabling the transmitting of torque therebetween. FIG. 2 illustrates one example of a possible embodiment of the catching portion 16.

According to the present invention, it is now possible to hard-machine the two components of the shaft-hub connection 10, i.e. the drive shaft 12 and the brake disk 20, in a rotating manner in only one chucking, respectively.

Figure 3:
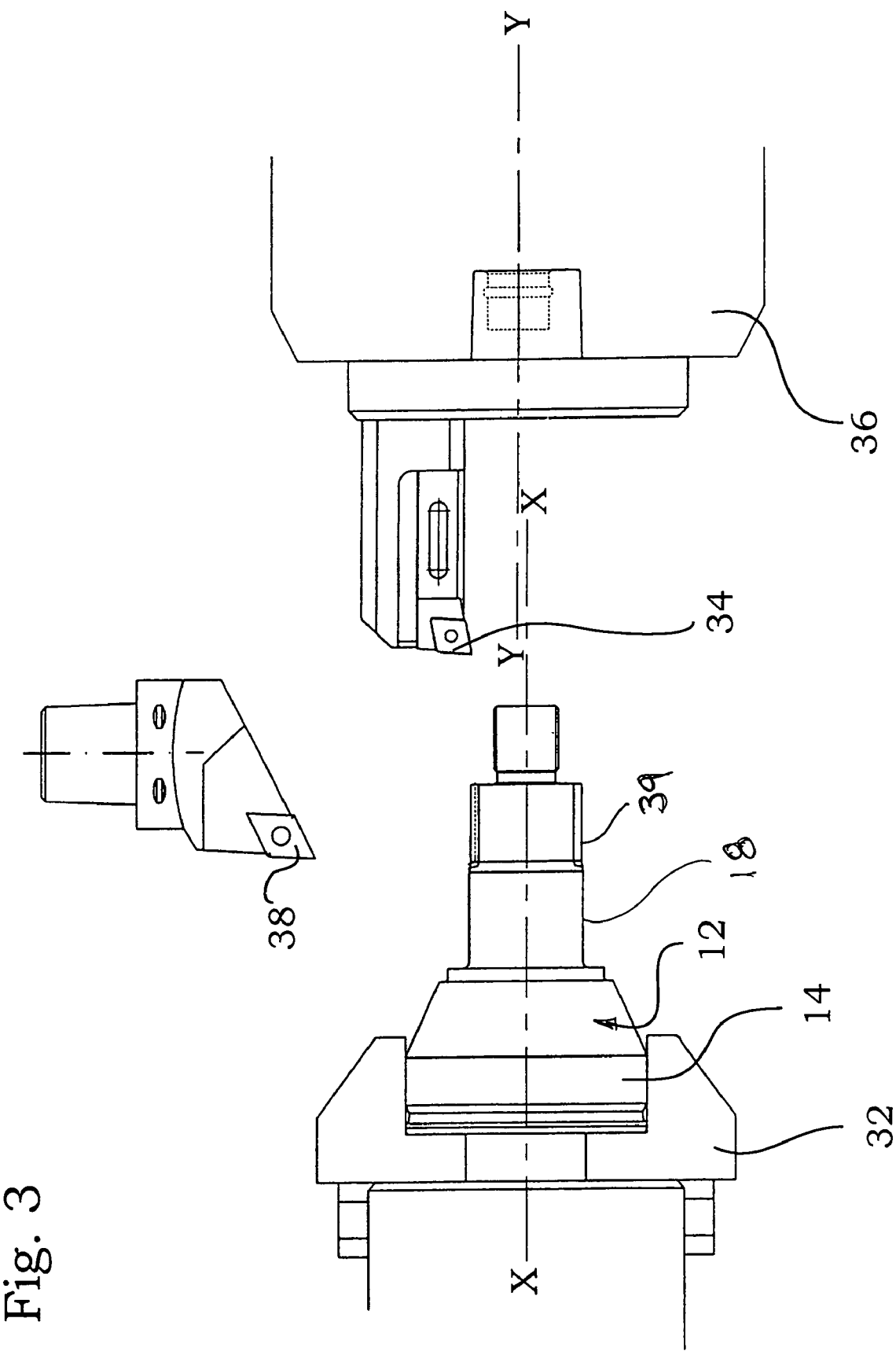
FIG. 3 shows a sectional view of a chucked drive shaft and the machining tools.

FIG. 3 shows such a chucking of the drive shaft 12. The drive shaft 12 is secured in a working piece spindle 32 in the region of the bell 14 and is rotated around a rotational axis X—X. A first lathe tool 34 is secured in a first tool spindle 36 and is rotated around a rotational axis Y—Y. The two rotational axes, X—X and Y—Y, are offset relative to each other by a certain amount in order to make possible the forming of a cycloidal or polygonal outer contour 39 onto the appropriate portion (resulting in the catching portion 16) of the drive shaft 12. As further seen in FIG. 3, a second lathe tool 38 is provided to turn the non-polygonal contours, the ideally cylindrical outer contours, of other portions of the drive shaft 12 such as the bearing seat 18.

Figure 4:
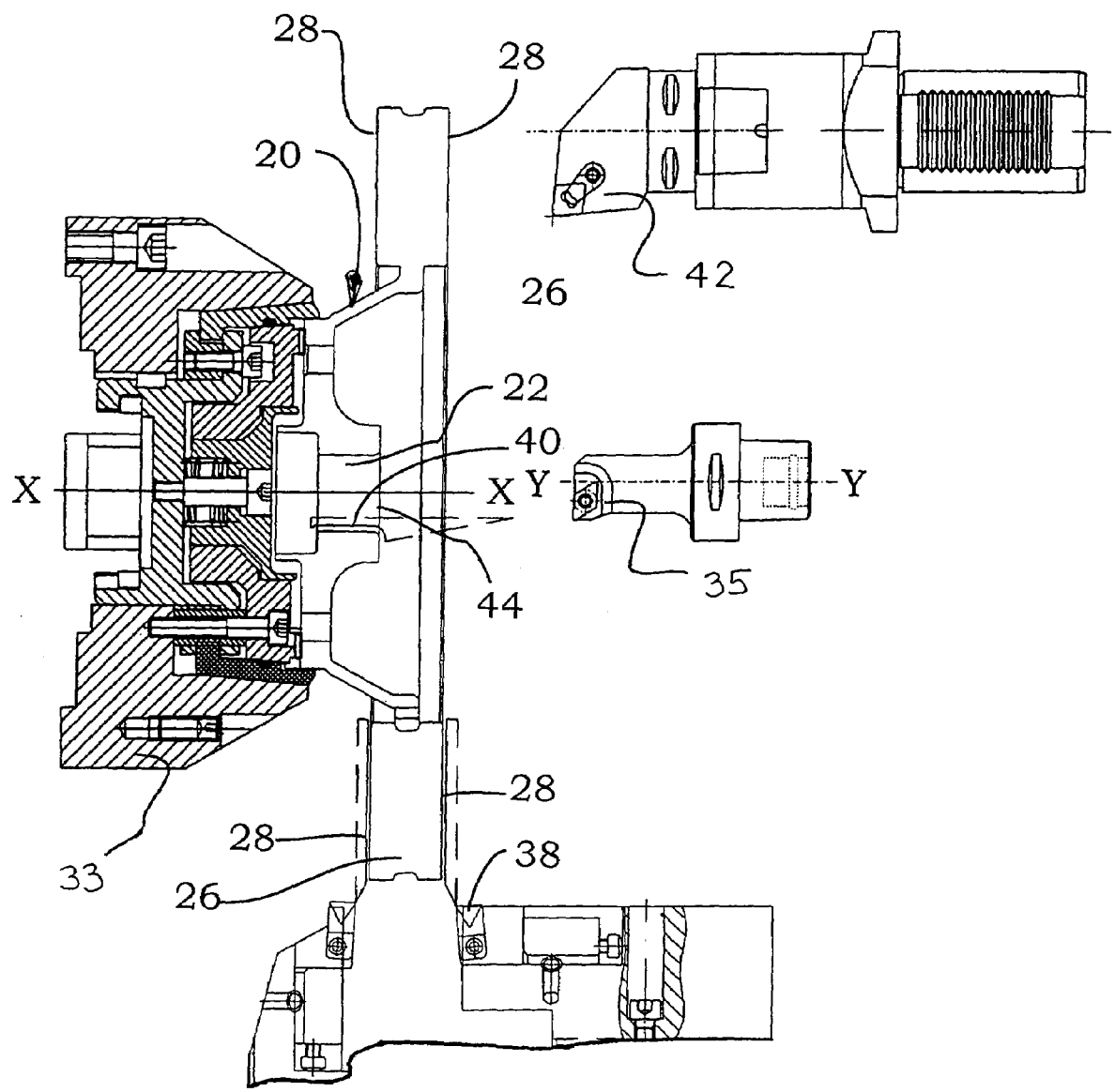
FIG. 4 shows a sectional view of a chucked brake disk and the machining tools.

FIG. 4 illustrates the manufacturing of the brake disk 20 in accordance with this invention. The brake disk 20 is also chucked in a working piece spindle 33 and is machined by several lathe tools. A first lathe tool 35 is provided to turn an inner contour 40 of the aperture 22 in the brake disk 20. As with the manufacturing of the drive shaft 12, the rotational axis Y—Y of the first lathe tool 35 is offset (in the same amount) relative to the rotational axis X—X of the brake disk 20 thereby forming a cycloidal or polygonal inner contour corresponding with the cycloidal or polygonal outer contour 39 of the drive shaft 12. A second lathe tool 38 is also provided and machines the brake surfaces 28 or the brake body 26. Finally, a third tool 42 machines shoulders 44 in the brake disk 20, which, in the assembled state, abut bearing shoulders 46 of a bearing 48 (cf. also FIG. 1).

Figure 5:
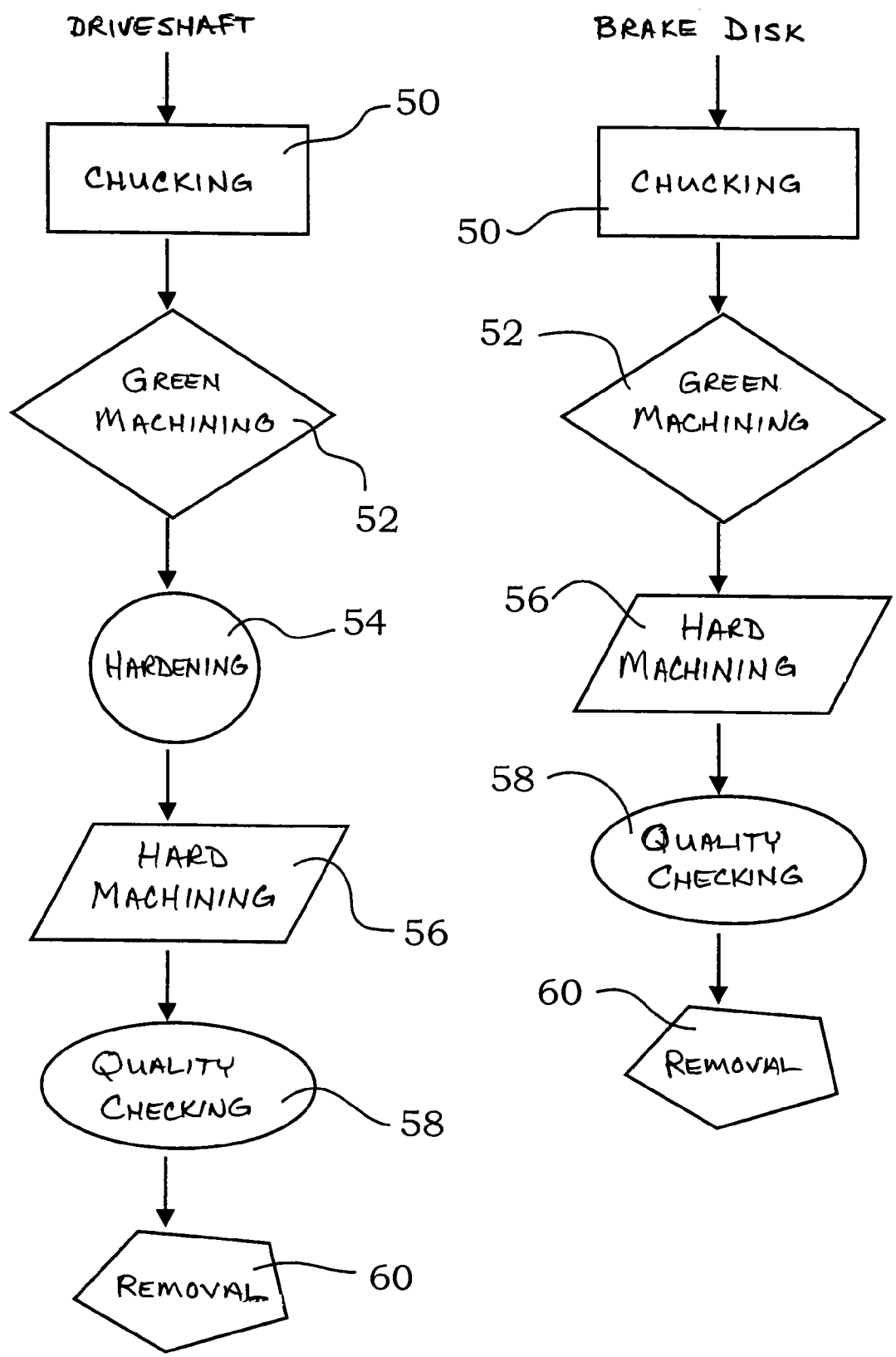
FIG. 5 shows a flow diagram of the method according to the present invention.

FIG. 5 illustrates in a flow diagram the method for manufacturing the shaft-hub connection 10 according to the present invention. At first, the drive shaft 12 as well as the brake disk 20 are chucked into the respective working piece spindles 32, 33 (procedural step 50) followed in both cases by rough or green machining 52 via turning of the brake disk 20 and drive shaft 12. Regarding the brake disk 20, mainly the brake body 26 and in particular the brake surfaces 28 are subjected to green machining. Regarding the drive shaft 12, the rough or green machining 52 roughly forms the bell 14, the bearing seat 18 and the end portion 13. Further, the green machining 52 includes the rough forming of the cydoidal or polygonal catching portion 16 in the drive shaft 12. Thereafter, but in the same working step, a thread is turned onto the end portion 13 of the drive shaft 12.

The next procedural step for the drive shaft 12 is the hardening 54 of the drive shaft 12. This can be accomplished, for example, by heat treating.

The next procedural step for manufacturing the drive shaft 12, as well as manufacturing the brake disk 20, is the final hard finishing (hard machining 56). In this step, the final accurate dimensions are created via turning. This applies especially to the manufacturing of the inner contour 40 of the aperture 22, the shoulders 44, the bearing shoulders 46 and the catching portion 16.

After a quality check 58, for example a crack detection check, the step of removing 60 of the drive shaft 12 and the brake disk 20 from the working piece spindles 32, 33 is performed. Finally, the components, the finished brake disk 20 and drive shaft 12, can be assembled.

The present invention is not limited to the example embodiments described and illustrated, but includes all methods having a like effect. It has been proved particularly advantageous to turn the transitions between the unround or polygonal catching portions 16 and the ideally cylindrical portion XY, as well as other areas not extending parallel to the respective rotational axis, by means of a so-called transverse turning slide. This allows a movement in the direction of the rotational axis of the component to be manufactured and hence the forming of transitions having an extremely small notch winding, which significantly prolongs the lifetime of the shaft-hub connection.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

We claim:

1. A method for manufacturing a shaft-hub connection comprising the steps of:
    chucking in a first working piece spindle a brake disk having a hub and an aperture therein;
    chucking in a second working piece spindle a drive shaft having a bell and a catching portion adapted to extend into the aperture;
    green machining via turning the brake disk while the brake disk is chucked in the first working spindle;
    green machining via turning the drive shaft while the drive shaft is chucked in the first working spindle;
    hardening the drive shaft while the drive shaft is chucked in the first working spindle;
    final finishing via turning the brake disk while the brake disk is chucked in the first working spindle;
    final finishing via turning the drive shaft while the drive shaft is chucked in the first working spindle;
    whereby final dimensions of the brake disk and drive shaft are respectively obtained in a single chucking action.

2. The method according to claim 1, characterized in that said green machining via turning of the brake disk includes machining of a brake body, including brake surfaces of the brake disk.

3. The method according to claim 1, characterized in that said green machining via turning of the drive shaft includes machining of the bell, a polygonal contour in a catching portion, bearing seats, and an end portion of the drive shaft including the turning of a thread onto the end portion.

4. The method according to claim 1 wherein said step of final finishing via turning of the brake disk includes the creation of the final dimensions of a polygonal inner contour of the aperture and bearing shoulders.

5. The method according to claim 1 wherein said step of final finishing via turning of the drive shaft includes the creation of the final dimensions of a polygonal outer contour of the catching portion and of bearing shoulders.

6. The method according to claim 1 comprising the steps of of securing a first lathe tool in a first tool spindle, rotating the drive shaft about a rotational axis (X—X), and rotating the first lathe tool about a second rotational axis (Y—Y), whereby the rotational axis X—X is offset relative to the rotational axis Y—Y by a predetermined amount to generate a polygonal contour on the catching portion.

7. The method according to claim 1 comprising the steps of securing a first lathe tool in a first tool spindle, rotating the brake disk about a rotational axis (X—X), and rotating the first lathe tool about a second rotational axis (Y—Y), whereby the rotational axis X—X is offset relative to the rotational axis Y—Y by a predetermined amount to generate a polygonal contour in the aperture.

8. The method according to claim 7 comprising the step of using an additional lathe tool to turn generally cylindrical contours of the brake disk in the same chucking.

9. The method according to claim 7 further comprising machining the braking faces of said brake disk with a second lathe tool and creating the shoulders with a third tool, all in the same chucking.

10. The method according to claim 1 further comprising the step of providing finished products with a rated/actual value deviation amounting to less than 10 micrometers.

11. The method according to claim 1 further comprising the step of joining the brake disk and drive shaft together wherein the finished shaft-hub connection has a wobble smaller than 25 micrometers.

12. The method according to claim 6 comprising the step of using a second lathe tool to turn generally cylindrical outer contours of the drive shaft in the same chucking.

* * * * *